United States Patent [19]

Winsor

[11] 3,945,164

[45] Mar. 23, 1976

[54] NAILABLE HOLLOW STRUCTURAL MEMBER

[75] Inventor: Robert Beck Winsor, Senneville, Canada

[73] Assignee: IEC-Holden Ltd., Montreal, Canada

[22] Filed: Nov. 13, 1974

[21] Appl. No.: 523,472

[52] U.S. Cl. .................. 52/377; 52/580; 52/593
[51] Int. Cl.² .................. E04B 5/00; E04C 1/10
[58] Field of Search ............ 52/377, 368, 376, 364, 52/372, 373, 374, 375, 367, 598, 599, 579, 580, 738

[56] References Cited
UNITED STATES PATENTS

| | | | |
|---|---|---|---|
| 2,101,056 | 12/1937 | Frick | 52/580 |
| 2,104,506 | 1/1938 | Coddington | 52/374 |
| 2,336,999 | 12/1943 | Peelle | 52/731 |
| 2,667,243 | 1/1954 | Fenske | 52/377 |
| 2,955,687 | 10/1960 | Seim | 52/377 |
| 3,269,072 | 8/1966 | Black | 52/377 |
| 3,324,616 | 6/1967 | Brown | 52/377 |
| 3,394,525 | 7/1968 | McKee et al. | 52/731 |
| 3,416,278 | 12/1968 | Swenck et al. | 52/377 |
| 3,444,661 | 5/1969 | Santho | 52/364 |
| 3,834,105 | 9/1974 | Powers | 52/377 |

Primary Examiner—Ernest R. Purser
Assistant Examiner—Robert Farber
Attorney, Agent, or Firm—Diller, Brown, Ramik & Wight

[57] ABSTRACT

A nailable hollow structural member comprising an elongated hollow member of sheet metal formed to define opposed clamping walls and end walls spaced apart between the clamping walls. The clamping walls extend in substantially parallel planes. An elongated boss is formed in each of the clamping walls and extends longitudinally of the tubular member in alignment with one another. One of the clamping walls and one of the end walls has a connectable portion opposed to one another. Spacer means is provided for maintaining one of the clamping walls in juxtaposition with a clamping wall of another hollow member and spaced apart by the spacer means to form an elongated opening between the hollow member constituting a nail receiving slot. Means are also provided for movably securing two or more of the hollow members with the clamping walls juxtaposed. The elongated boss in both of the clamping walls deforms a nail inserted in the slot to retain it therein.

22 Claims, 15 Drawing Figures

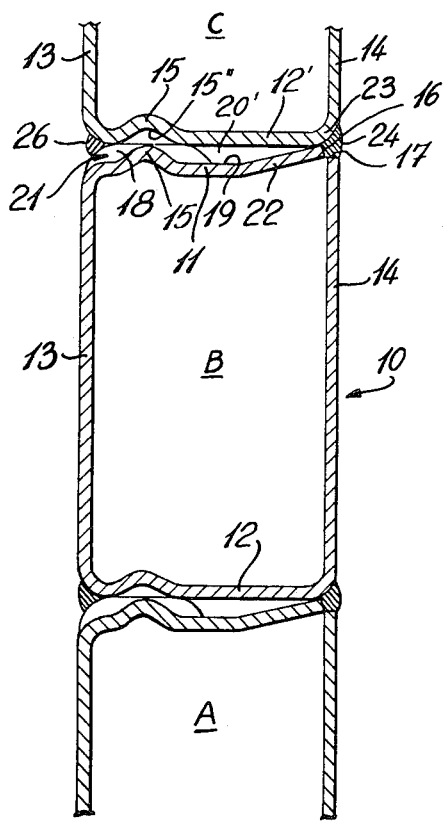
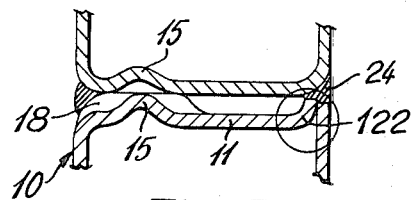
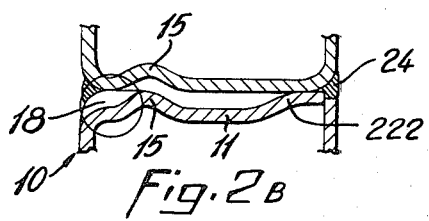
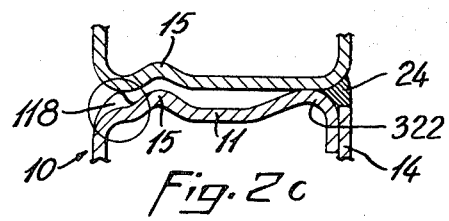
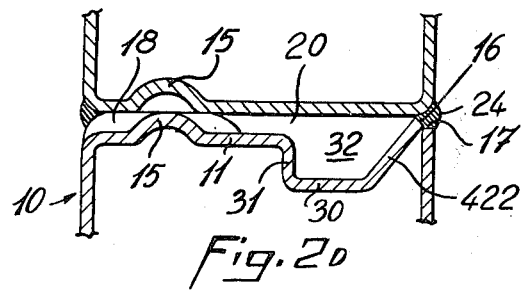
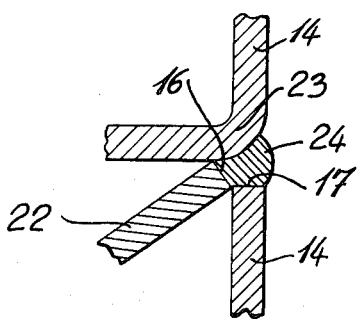
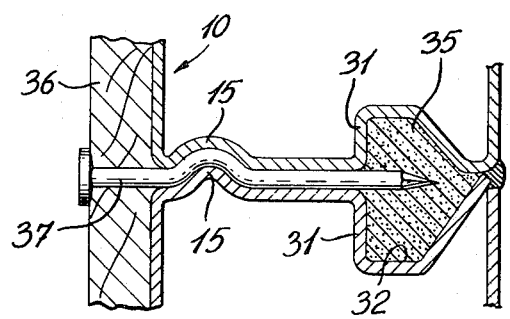

NAILABLE HOLLOW STRUCTURAL MEMBER

BACKGROUND OF THE INVENTION

1. Field of the Invention

The present invention relates to a structural element and more particularly to an improved nailable hollow structural member.

2. Description of the Prior Art

Nailable metallic structures consisting of spaced apart channels defining a gap therebetween to receive and retain nails therein, and wherein the nails are distorted by the gap, are heretofore known. The present invention is an improved version in such structures but usable to construct walls or other structures where it is desirable to drive nails therein. One of the clamping walls has a corner edge in close proximity to the opposed connectable portions. Means are also provided for interconnecting two or more of the hollow members with the clamping walls juxtaposed so that the said two or more hollow members form a wall section having a substantially uniform wall on one side and a slotted wall on the opposite side. Further, the hollow structural member of the present invention is formed from a single sheet of metal whereas in the prior art the channels are normally formed of two or more different metallic parts which require to be fastened to one another. Because structures formed of such channels define gaps between channels to receive nails, these structures cannot form a seal wall on one side thereof as the gap extends across a wall element formed by the channel members. With the present invention, there is provision to seal the gap adjacent one end wall of opposed members when connected together.

SUMMARY OF THE INVENTION

It is a feature of the present invention to provide an improved nailable hollow structural member.

According to the above features, from a broad aspect, the present invention provides a nailable hollow structural member comprising an elongated hollow member of sheet metal formed to define opposed clamping walls and end walls spaced apart between the clamping walls. The clamping walls extend in substantially parallel planes. An elongated boss is formed in each of the clamping walls and extends longitudinally of the tubular member in alignment with one another. One of the clamping walls and one of the end walls has a connectable portion opposed to one another. Spacer means is provided for maintaining one of the clamping walls in juxtaposition with a clamping wall of another hollow member and spaced apart by the spacer means to form an elongated opening between the hollow members constituting a nail receiving slot. The elongated boss in both of the clamping walls deforms a nail inserted in the slot to retain it therein.

BRIEF DESCRIPTION OF THE DRAWINGS

A preferred embodiment of the present invention will now be described with reference to the examples illustrated by the accompanying drawings in which:

FIG. 1 is a cross sectional view of a nailable hollow structural member of the present invention, partly fragmented, and showing its attachment to a connectable wall of a further identical member;

FIG. 2A – 2E are each fragmented sectional views of variations of the connectable wall of the hollow member;

FIG. 3 is an enlarged fragmented view showing the connection between end edges of a metallic hollow member with a further hollow member;

DESCRIPTION OF THE PREFERRED EMBODIMENTS

Figure 4A:
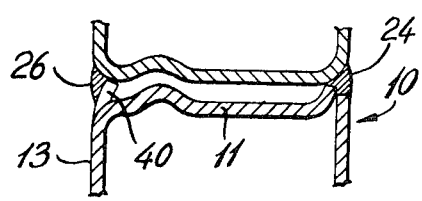
FIG. 4A is a fragmented sectional view of a variation of a spacer means and interlock between members.

Referring now to the drawings, and more particularly to FIG. 1, there is shown a cross sectional view of the nailable metallic hollow structural member 10 of the present invention. The member 10 is formed from a single sheet of metal and defines opposed clamping walls 11 and 12. End walls 13 and 14 are formed integrally with the clamping walls and are spaced apart from the ends of the clamping walls. Also, the clamping walls are positioned substantially parallel to each other as are the end walls. An elongated boss 15 is formed in each of the clamping walls 11 and 12 and extends longitudinally throughout the tubular member and in alignment with one another in a plane transverse to said clamping walls. One of the clamping walls and one of the end walls, hereinshown walls 11 and 14, respectively, have a connectable portion, hereinshown as end edge 16 and 17 (see FIGS. 4A–4E.)

A spacer means, herein a transverse ridge 18, is formed within one of the clamping walls. As shown, the ridge 18 extends above the outer surface 19 of the clamping wall 11 whereby the opposed clamping wall of another tubular member (hereinshown) as wall 12') may be secured in juxtaposition to the clamping wall 11 and is spaced apart by the ridge 18. As shown, the ridge 18 extends transversely to the elongated boss 15 and extends thereacross. These ridges 18 are provided throughout the length of the channel 10 and spaced apart whereby to prevent juxtaposed channels from touching each other whereby to form a nail receiving slot 20 between juxtaposed channel members with an elongated opening 21 extending on the side formed by the end walls 13. The length of the end walls may vary depending on the particular use of the channel.

As can be seen, the clamping wall 11 having the connectable end edge 16 has an end portion 22 thereof which is angulated upwardly whereby the end edge 16 is positioned in close proximity to the end edge 17. The reason for this positioning of the end edge is that when the hollow member 10 is connected to a juxtaposed hollow member 10, a corner 23 of the juxtaposed tubular member is also in close proximity to the edges 16 and 17. Therefore, by forming a single weld 24 in this area, the connectable end edges are secured together as well as securing the juxtaposed channels together. An enlarged view of the weld location is shown in FIG. 3. A further weld 26 is made between the leading edge of the boss 15 and a forward portion of the opposed clamping wall of a juxtaposed member 10 whereby to provide a more rigid interlock of two adjacent members 10.

As can be seen from FIG. 1, the elongated boss as a smooth curvature in cross section providing a sloping leading edge 15' on the side facing the opening 21 of the slot 20. Therefore, when a nail is driven into the slot 20, the leading end of the nail will rise on this leading edge 15' and then be forced to turn downwardly when it hits the trailing edge 15'' of the boss of the juxtaposed member and then lodge itself into the slot 20. Thus, the nail is rigidly retained within the slot 20 by means of the deformation which is formed therein in the region of the opposed bosses 15.

Referring now to FIGS. 2A and 2B, there are shown variations of the connecting portion or end portions of the clamping wall 11. As shown in FIG. 2A, the clamping wall 11 is substantially horizontal throughout its length with the end portion 122 being upwardly turned whereby the end edge will lie in the proper position to be secured by the weld 24. As shown in FIG. 2B, the end portion 222 extends angularly upwards from the clamping wall 11 and then extends substantially horizontal to the connecting end edge thereof which is also interconnected by the weld 24.

Referring now to FIG. 2C, there is shown further variations in the end portion of the clamping wall 11. Hereinshown, the end portion 322 extends angularly upwards and then arcuately whereby the portion adjacent the free end of the end portion extends substantially vertically and parallel to the end wall 14. The weld 24 is thus formed between a portion of the end portion 322 adjacent the end edge of the wall 14. As can also be seen from FIG. 2C, the spacer means is hereinshown as a rounded cone 118 disposed forwardly of the elongated boss 15. The cone 118 may also be welded to the opposite clamping wall 11 of a juxtaposed member 10, as heretofore described.

Referring now to FIG. 2D, there is shown a variation in the formation of the clamping wall 11. As shown, the end portion 422 from the connectable end edge 16, extends angularly inwards into the hollow member 10 along a first section and then extends substantially parallel to the clamping wall 11 along a further section denoted by a numeral 30 to define a spacing wall between the first section 422 and a second section 31 which extends upwardly to connect with the parallel wall 11 behind the boss 15. The second section 31 constitutes a stiffening wall to prevent deformation of the wall 11 when a nail is being lodged in the slot 20.

The area 32 constitutes a pocket wherein a sealant may be introduced to seal the gaps formed between the welds 16 as illustrated in FIG. 2E. As shown in FIG. 1, a plurality of channels are connected in juxtaposition to form a wall panel. The welds 24 may be longitudinal or spot welds and in such an arrangement, it is desirable to introduce a sealant in the pocket 32 whereby to seal the space between the welds as the outside wall is normally located outside of a structure. Of course, the members 10 can be secured in a wall panel wherein the slots extend either horizontally or vertically.

Referring now to FIG. 2E, there is shown a still further variation of the clamping walls 11 and 12 in that both clamping walls are formed with a stiffening wall 31 whereby to provide more rigid wall sections in the area of the boss 15. Further, it can be seen that the pocket 32 is substantially larger. The location of a sealant 35 is shown in the pocket 32. Also, this figure shows the manner in which a wall board or surface panel 36 may be secured to a wall structure formed of these hollow members 10. As can be seen, the nail 37 extends through the wall board 36 and into the pocket. Of course, the length of the nail is determined by the thickness of the member 10 and the thickness of the panel 36 being secured thereto.

Figure 4B:
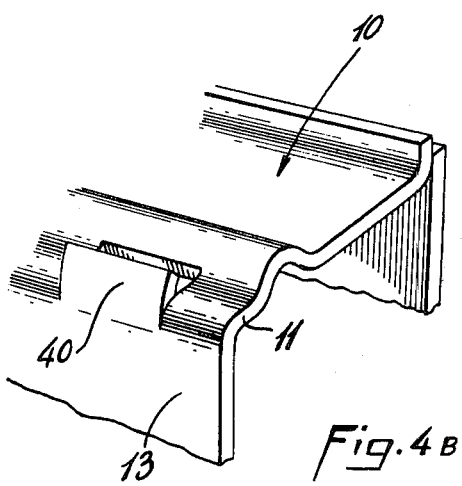
FIG. 4B is a perspective view of a fragmented portion of the hollow member illustrating the spacer means.

Referring now to FIGS. 4A to 4E, there are shown further variations of the spacer means of the hollow member of the present invention. As shown in FIGS. 4A and 4B, the spacer means is constituted by a tab 40 formed integral with the hollow member 10 and adjacent the upper end of the end wall 13 whereby the tab 40 will extend upwardly from the upper face of the clamping wall 11. A short weld 26 may also be formed between the tab 40 and the adjacent portion of the juxtaposed member 10, as shown in FIG. 4A.

Figure 4C:
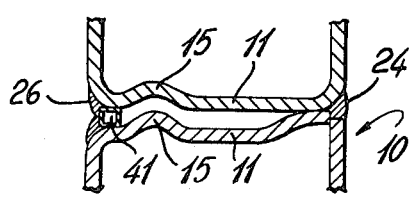
FIG. 4C–4E and 4G are fragmented sectional views of further variations of the spacer means and interlock between members.

Referring now to FIG. 4C, the spacer means is hereinshown as a separate weldable element 41 which is inserted between the clamping wall 11 of juxtaposed members 10 and forwardly of the elongated boss 15. The element 41 is secured in position by welds 26 formed on each side of the element 41 with adjacent portions of the clamping walls 11.

Figure 4D:
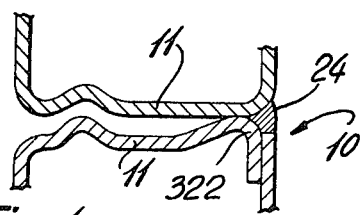

Referring now to FIG. 4D, it can be seen that with the particular embodiment of the clamping wall as illustrated also in FIG. 2C, the end portion 322 of the clamping wall may be formed whereby to position the clamping walls 11 in spaced apart relationship and wherein the weld 24 is sufficiently strong to retain both of these walls 11 in substantially parallel relationship whereby to retain a nail therebetween. In the particular embodiment, the spacer means is constituted solely by the shape of the end portion 322 of the clamping wall.

Figure 4F:
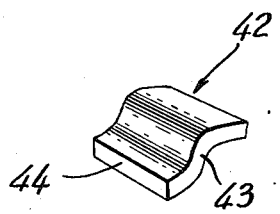
FIG. 4F is a perspective view of a spacer element utilized in FIG. 4E.
Figure 4E:
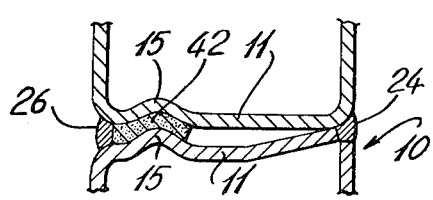

Referring not to FIGS. 4E and 4F, there is shown a still further embodiment of the spacer means. Hereinshown, the spacer means is constituted by a spacer element 42 having a smooth transverse curvature 43 which conforms to the transverse curvature of a portion of the boss 15, whereby the spacer 42 may be lodged between the walls 11 and in the area extending at least partially across the adjacent clamping walls 11, between the bosses 15 of adjacent clamping walls 11. The forward edge 44 of the spacer 42 is then welded between the members 10 by weld 26 as illustrated in FIG. 4E.

Figure 4G:
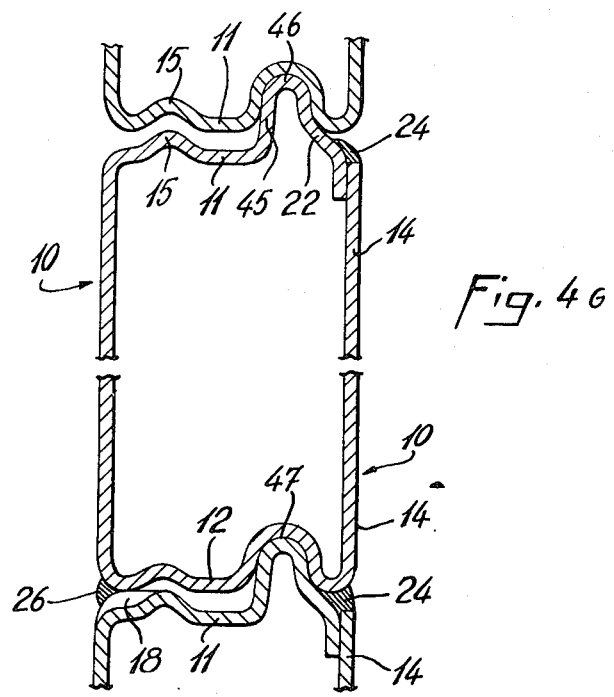

Referring now to FIG. 4G, there is shown two embodiments of a further clamping wall configuration. Hereinshown, the clamping walls 11 of adjacent hollow members 10 are interconnected together by the geometry of the walls 11. As shown, the clamping wall 11 is provided with an elongated boss 46 rearwardly of the boss 15 and projecting above the wall 11 and the boss 15. The opposite clamping wall 12 of the member 10 is provided with a concave channel portion 47 extending throughout the length of the member 10 and having a configuration whereby to receive and retain the boss 46 therein. The boss 46 fits slideably into the channel 47. As further shown in FIG. 4G, the weld 24 may be made to interconnect the clamping wall 11 to the end wall 14 or to interconnect the clamping wall 11, the end wall 14 and a connecting portion of the end wall 14 of the adjacent member 10. Also, a transverse ridge 18 may be formed in the clamping wall 11 and secured to a portion of the adjacent clamping wall 12 of a superimposed member 10, by means of the weld 26.

A particular application of the members 10 is for the construction of an end wall panel as utilized in railway box cars. In such box cars, it is often required to brace the loads carried by the cars and this can be done by securing a filler to the end wall panel. With this type structure, it can be seen that box car end walls may be easily repaired, if damaged, by simply removing the members 10 that are damaged. This can be done by grinding, burning or cutting the welds between the damaged members 10 and simply inserting another member and rewelding. End walls formed with such metallic hollow members are much more durable than conventional wooden wall structures. The members 10 may be assembled horizontally or vertically, as required by different construction considerations.

A further application of hollow structural member 10 is as a railway box car side wall where when installed vertically, the members provide in themselves the normal construction of outside sheeting, inside sheeting and vertical posts. Such an application would simplify railway car construction and provide nailing grooves throughout the car length. Such nailing grooves could be utilized for nailing load restraining blocking into position wherever they were required in the car. Also load bearing straps can be nailed to the car wall, thus constructed. For example, straps can be nailed to both sidewalls, and joined in the center of the box car to restrain a load such as newsprint rolls from longitudinal motion relative to the box car. Another example is that the structure on each side of the door of such box cars often require nails to be inserted therein to retain a wall membrane which is secured across a portion of the door if the box car is utilized to carry grain.

Figure 5:
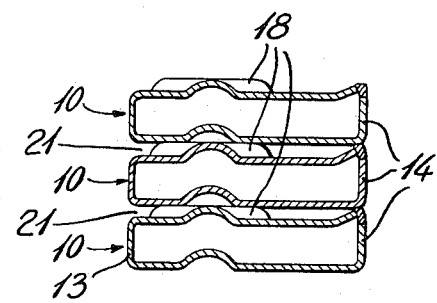
FIG. 5 is a sectional view illustrating the hollow metallic members extending vertically for use as in a side wall construction, the members also including a dimensional variation in their size.

Referring now to FIG. 5, there is shown a dimensional variation of the hollow structural members 10, wherein the end walls 13 and 14 are of very short lengths thus providing a greater plurality of more closely spaced elongated openings 21 to receive nails.

Although specific applications of the nailable hollow member 10 have been illustrated and described herein many other applications of the metallic channel 10 are possible. Also, different applications could require different strength requirements and hence the geometry of the cross section could vary accordingly. The shape of these members is dependent, not only on strength requirements, but also on flexibility of nailing location requirements. Also, many obvious variations in the shape of the end walls can be made to make decorative or aesthetically pleasing walls. Further, the hollow area within the channel 10 may be filled with material for thermal or sound insulation.

I claim:

1. An interconnectable nailable hollow structural member for constructing wall sections, comprising an elongated hollow member of sheet metal formed to define opposed clamping walls and end walls spaced apart between said clamping walls, said clamping walls extending in substantially parallel planes, an elongated boss formed in each clamping walls and extending longitudinally of said tubular member in alignment with one another, one of said clamping walls and one of said end walls having an opposed connectable portion, spacer means for maintaining one of said clamping walls in juxtaposition with a clamping wall of another hollow member and spaced apart by said spacer means to form an elongated opening between said hollow members constituting a nail receiving slot, said elongated boss deforming a nail inserted in said slot, one of said clamping walls having a corner edge in close proximity to said opposed connectable portions, and means for interconnecting two or more of said hollow members with said clamping walls juxtaposed so that said two or more hollow members form a wall section having a substantially uniform wall on one side and a slotted wall on the opposed side.

2. A nailable hollow structural member as claimed in claim 1 wherein said connectable portions are end edges, said one clamping wall having said connectable end edge being angulated in a portion thereof from said connectable end edge, said connectable end edge of said clamping wall and said corner edge of one end wall being positioned in close proximity adjacent each other.

3. A nailable hollow structure member as claimed in claim 1 wherein said clamping wall having said connectable end edge extends angularly inwards into said hollow member from said connectable end edge and along a first section and then extends upwardly along a second section defining a stiffening wall, said first and second sections being formed integral with said clamping wall having said connectable end edge.

4. A nailable hollow structural member as claimed in claim 3 wherein a spacing wall section is formed between said first and second sections, and a pocket formed by the area between said first and second sections and a portion of said clamping wall of said juxtaposed hollow member.

5. A nailable hollow structural member as claimed in claim 4 wherein a sealant is contained in said pocket.

6. A nailable hollow structural member as claimed in claim 5 wherein said means for interconnecting comprises one or more welds formed between said opposed connectable end edges and a corner of said other hollow members in juxtaposition.

7. A nailable hollow structural member as claimed in claim 1 wherein said spacer means is two or more spaced apart ridges in one of said clamping walls.

8. A nailable hollow structural member as claimed in claim 7 wherein said spacer ridges each extend at least over said one clamping wall between said end wall opposite said end wall having said connectable end and said elongated boss and wherein a weld is made between said spacer ridge and a portion of a juxtaposed clamping wall.

9. A nailable hollow structural member as claimed in claim 7 wherein each said spacer ridge is a rounded cone disposed forwardly of said elongated boss.

10. A nailable hollow structural member as claimed in claim 7 wherein each said spacer ridges is a tab formed integral with said hollow member and extending above one of said clamping walls.

11. A nailable hollow structural member as claimed in claim 7 wherein each said spacer ridges is a separate weldable element welded between said juxtaposed clamping walls forwardly of said elongated boss.

12. A nailable hollow structural member as claimed in claim 7 wherein each said spacer ridges is a separate spacer element having a curvature adapted to be captive between adjacent elongated bosses of juxtaposed clamping walls.

13. A nailable hollow structural member as claimed in claim 1 wherein said spacer means is formed integral with at least one clamping wall of said elongated hollow member between said elongated boss and said means for immovably securing said hollow members.

14. A nailable hollow structural member as claimed in claim 13 wherein said spacer means is an upward formation in said clamping wall and extending above said elongated boss whereby to abut against a clamping wall of a juxtaposed hollow member to maintain said juxtaposed clamping wall in a spaced apart relationship.

15. A nailable hollow structural member as claimed in claim 22 wherein said spacer means is also welded to the clamping wall of a juxtaposed hollow member.

16. A nailable hollow structural member as claimed in claim 1 wherein said clamping wall having said connectable portion is provided with an inwardly curved free edge portion, said inwardly curved portion extending in facial contact with a portion of an inner face of one of said end walls adjacent an end wall connectable edge, said connectable edge being welded to said curved portion and a corner edge portion of said clamping wall of said juxtaposed hollow member.

17. A nailable hollow structural member as claimed in claim 1 wherein said spacer means and said means for interconnecting is constituted by an elongated projection formed in one of said clamping walls and projecting above said boss in said one clamping wall, an elongated channel in said other clamping wall, said projection being frictionally retained in said channel in a juxtaposed structural member whereby to interlock adjacent structural members and maintain opposed clamping walls of juxtaposed members spaced apart to form said nail receiving slot.

18. A nailable hollow structural member as claimed in claim 1 wherein said elongated boss in each said clamping walls of said hollow member is of smooth curvature.

19. A wall structure comprising two or more nailable metallic channels as claimed in claim 1, each said channels being connected to one another with their clamping walls in juxtaposition, said elongated opening between each juxtaposed clamping walls facing inwardly of said wall, said connectable end edges facing outwardly of said wall.

20. A nailable hollow structural member as claimed in claim 1 wherein said substantially uniform wall is a substantially sealed wall.

21. A nailable hollow structural member as claimed in claim 1 wherein said means for interconnecting comprises securing said corner edge and opposed connectable portions together.

22. A nailable hollow structural member as claimed in claim 21 wherein said means for interconnecting comprises one or more welds formed between said opposed connectable end edges and said corner edge of said other hollow member in juxtaposition, a pocket formed by the area between said first and second sections and a portion of said clamping wall of said juxtaposed hollow member, and a sealant contained in said pocket.

* * * * *